(12) United States Patent
Mohrlock et al.

(10) Patent No.: US 8,967,670 B2
(45) Date of Patent: Mar. 3, 2015

(54) SUBFRAME WITH INTEGRATED PNEUMATIC OR HYDRAULIC LIQUID VESSEL FOR THE VEHICLE CHASSIS OF MOTOR VEHICLES

(75) Inventors: Dominik Mohrlock, Buxheim (DE); Thomas Janek, Iserlohn (DE); Andreas Goercke, Ingolstadt (DE); Roland Hudler, Manching (DE); Friedrich-Oskar Winter, Nennslingen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/130,346

(22) PCT Filed: Jun. 20, 2012

(86) PCT No.: PCT/EP2012/002589
§ 371 (c)(1),
(2), (4) Date: Apr. 1, 2014

(87) PCT Pub. No.: WO2013/004347
PCT Pub. Date: Jan. 10, 2013

(65) Prior Publication Data
US 2014/0217782 A1 Aug. 7, 2014

(30) Foreign Application Priority Data
Jul. 1, 2011 (DE) .......................... 10 2011 106 250

(51) Int. Cl.
*B62D 21/16* (2006.01)
*B60G 11/30* (2006.01)
(Continued)

(52) U.S. Cl.
CPC ................ *B62D 21/16* (2013.01); *B60G 11/30* (2013.01); *B62D 21/11* (2013.01); *F17C 13/084* (2013.01); *B60G 2204/15* (2013.01);
(Continued)

(58) Field of Classification Search
CPC ....................................................... B62D 21/16
USPC .................................................. 280/782, 783
See application file for complete search history.

(56) References Cited

U.S. PATENT DOCUMENTS 3,880,445 A * 4/1975 Chieger ........................ 280/783
4,753,174 A 6/1988 Berg et al.
(Continued)

FOREIGN PATENT DOCUMENTS

DE 39 09 916 A1 9/1990
DE 39 40 250 A1 6/1991
(Continued)

OTHER PUBLICATIONS

International Search Report issued by the European Patent Office in International Application PCT/EP2012/002589 on Oct. 8, 2012.

*Primary Examiner* — Ruth Ilan
(74) *Attorney, Agent, or Firm* — Henry M. Feiereisen LLC

(57) ABSTRACT

The invention relates to a subframe for the vehicle chassis of motor vehicles, which subframe has at least one cavity usable as a pressure accumulator and has a cross member (1) which is connected, at the two end faces (27, 28) thereof, to a node element (3, 4). Bearing elements (10 to 12) and/or further frame elements are attached to the node elements (3, 4). The cross member (1) is formed as a continuous rib-reinforced component or extruded part (15) and forms for the pressure accumulator a pressure-resistant cavity which is closed off by the node elements (3, 4) at the end faces.

26 Claims, 2 Drawing Sheets

(51) Int. Cl.
  *B62D 21/11* (2006.01)
  *F17C 13/08* (2006.01)
  *B62D 29/00* (2006.01)

(52) U.S. Cl.
  CPC .. *F17C 2205/0119* (2013.01); *F17C 2221/031* (2013.01); *F17C 2223/0123* (2013.01); *F17C 2223/035* (2013.01); *F17C 2270/0168* (2013.01); *F15B 2201/405* (2013.01); *B62D 29/008* (2013.01)
  USPC .............. 280/782; 280/783; 280/124.109

(56) References Cited

U.S. PATENT DOCUMENTS

| | | | | |
|---|---|---|---|---|
| 5,632,471 | A | * | 5/1997 | Pradel ..................... 267/64.11 |
| 6,398,236 | B1 | * | 6/2002 | Richardson .................. 280/86.5 |
| 6,746,031 | B2 | * | 6/2004 | Carlstedt ................ 280/124.107 |
| 7,503,586 | B2 | | 3/2009 | Ramsey |
| 8,109,560 | B2 | * | 2/2012 | Joly-Pottuz .............. 296/187.04 |
| 8,146,948 | B2 | * | 4/2012 | Burns ........................... 280/831 |
| 2004/0251653 | A1 | | 12/2004 | Momiyama |

FOREIGN PATENT DOCUMENTS

| | | | |
|---|---|---|---|
| DE | 40 32 433 | A1 | 4/1992 |
| DE | 43 22 717 | C2 | 1/1995 |
| DE | 195 08 854 | A1 | 2/1996 |
| DE | 197 08 404 | A1 | 10/1997 |
| DE | 103 33 599 | B4 | 2/2005 |
| DE | 10 2004 003 713 | A1 | 8/2005 |
| DE | 10 2005 032 919 | A1 | 7/2006 |
| DE | 10 2005 016 492 | A1 | 10/2006 |
| DE | 10 2008 016 381 | | 1/2010 |
| DE | 10 2008 054 114 | A1 | 5/2010 |
| DE | 10 2009 034 857 | A1 | 2/2011 |
| FR | 2678867 | A1 * | 1/1993 |
| FR | 2822789 | A1 * | 10/2002 |
| WO | WO 2008/043642 | A1 | 4/2008 |

* cited by examiner

SUBFRAME WITH INTEGRATED PNEUMATIC OR HYDRAULIC LIQUID VESSEL FOR THE VEHICLE CHASSIS OF MOTOR VEHICLES

CROSS-REFERENCES TO RELATED APPLICATIONS

This application is the U.S. National Stage of International Application No. PCT/EP2012/002589, filed Jun. 20, 2012, which designated the United States and has been published as International Publication No. WO 2013/004347 and which claims the priority of German Patent Application, Serial No. 10 2011 106 250.9, filed Jul. 1, 2011, pursuant to 35 U.S.C. 119(a)-(d).

BACKGROUND OF THE INVENTION

The invention relates to a subframe for the vehicle chassis of motor vehicles.

Subframes are used in the automotive industry in the area of the vehicle chassis, for example, as an engine bracket or axle bracket. A subframe which is produced in hollow chamber design may additionally have the function of a pressure accumulator for storing hydraulic fluid or compressed air.

DE 10 2008 054 114 A1 discloses a subframe which is produced in hollow chamber design and has a storage volume for storing a gas or liquid medium. The subframe described in this printed publication is made of cast parts with cavities and it is noted there that in principle, also welded profile structures are conceivable having a wall thickness which has to be selected as a function of the operating pressure of the stored medium.

The invention is based on the object to provide a subframe for the vehicle chassis of motor vehicles, which includes a pressure accumulator and can be produced in an easiest possible way.

SUMMARY OF THE INVENTION

This object is achieved by a subframe for the vehicle chassis of motor vehicles, having at least one cavity configured as pressure accumulator, and a cross member which is connected at its two end faces with a node element as connection element, in particular is welded with a cast node, wherein bearing elements and/or further frame elements are mounted to the node elements, wherein the cross member is designed as a continuous rib-reinforced component and forms for the pressure accumulator a pressure-resistant cavity which is closed off by the node elements at the end faces.

Preferred refinements of the invention are the subject matter of the sub-claims.

According to the invention, the subframe has a cross member which is configured as a continuous rib-reinforced component, in particular as a continuous rib-reinforced extruded part, and forms a pressure-resistant cavity for a pressure accumulator. This pressure-resistant cavity is closed off at both end faces of the cross member by adjacent node elements which are preferably configured as cast nodes. The rib-reinforced component, preferably of metal and preferably formed by an extruded part, may have a substantially rectangular basic shape since the provided reinforcing ribs of the cross member impart a high compressive strength. Such rib-reinforced components can be manufactured as extruded parts of greater lengths and can very easily be sawed off or cut to length in any other way into sections, each of which forming a cross member.

The used rib-reinforced component or extruded part preferably has one or more inner intermediate plates which extend between opposite outer walls of the component or extruded part and thus divide the cavity of the cross member into several intermediate spaces. The intermediate plates thus form a rib reinforcement of the component or extruded part so that the latter is able to also withstand high pressures. As a result, the subframe can accommodate a pressure accumulator which is able to easily withstand operating pressures of, for example, 18 bar and a burst pressure of, for example, 50 bar. The use of the inner intermediate plates enables a reduction in the wall thickness of the outer walls, whereas the intermediate plates can, in turn, have a considerably smaller wall thickness than the outer walls. The thickness of the intermediate plates is preferably at most half the size as the thickness of the outer walls of the rib-reinforced component or extruded part.

According to a preferred refinement of the invention, the node elements preferably formed by cast nodes have each a connection cavity which spans the respectively associated open end face of the rib-reinforced component or extruded part. This connection cavity forms an overflow channel or overflow gap between the individual intermediate spaces formed by the intermediate plates. In the absence of such a connection cavity on at least one of the two ends faces of the component or extruded part, it would also be possible to provide overflow channels in the form of bores, slots or other openings in the intermediate plates.

The connection cavity may be configured as one or more grooves which form the overflow channels between the intermediate spaces of the component or extruded part. These grooves may extend into the node elements, for example transversely to the intermediate plates.

When, conversely, subsequently outfitting the intermediate plates with slots, bores or other openings, the node elements of the rib-reinforced component can terminate flush at both end faces, without requiring the node elements to form a connection cavity between the intermediate plates.

The cross member can be manufactured particularly easily as a component, in particular as an extruded part, with approximately rectangular cross section and with several intermediate plates or partitions and is welded along the outer wall at the end faces with the respectively associated node element or cast node. In the preferred embodiment, the respective node element forms a hood-shaped cover on the respective end face of the cross member, with the hood-shaped cover forming the afore-mentioned connection cavity between the intermediate spaces of the cross member or rib-reinforced component or extruded part. As a result, the presence of the pressure accumulator does not complicate the assembly of the subframe.

It is further preferably provided to arrange the pneumatic and/or hydraulic connections of the pressure accumulator, located in the subframe, on one or both terminal nodes elements. The node elements represent anyway a technically more complicated component so that the added provision of connections on the node elements requires only a slight modification of the mold for example.

The subframe according to the invention can be used particularly advantageously as rear-axle subframe with front and rear cross members, with the rear cross member accommodating the pressure-resistant cavity for the pressure accumulator. The rear-axle subframe can still have bearing elements for a transmission and fastening eyes for chassis control arms. The pressure accumulator can be used, e.g. as air reservoir for compressed air of an air suspension or, for example, also as oil tank for oil of an actively adjustable stabilizer or for transmission lubrication.

BRIEF DESCRIPTION OF THE DRAWING

The invention will now be described in more detail with reference to an exemplary embodiment shown in the drawing. It is shown in.

DETAILED DESCRIPTION OF PREFERRED EMBODIMENTS

Figure 1:
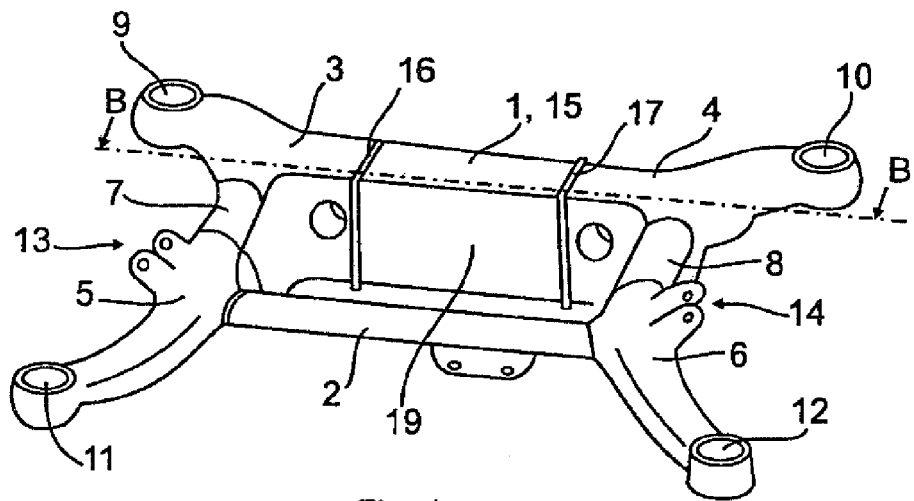
FIG. 1 the view of a subframe with front and rear cross members.

The subframe illustrated in FIG. 1 serves as a rear-axle subframe having a rear cross member 1 and a front tubular cross member 2 which extend between cast nodes 3, 4 and 5, 6, respectively. Tubular sections 7, 8 extend between the rear cast nodes 3, 4 and the front cast nodes 5, 6. Bearing elements 9 to 12 are formed on the cast nodes and serve as subframe mounts. Fastening eyes 13, 14 are attached at the front cast nodes 5, 6 to form attachment points for chassis control arms for example.

The cross member 1 extending between the cast nodes 3, 4 has essentially a rectangular basic shape and is produced as an extruded part 15. The open end faces of the extruded part 15 are welded to the respectively adjacent edges 16, 17 of the cast nodes 3, 4. The cast nodes 3, 4 thus close off both end faces of the extruded part 15 so that the interior space of the cross member 1 together with the cover as formed by the cast nodes 3, 4 provides a closed pressure-resistant cavity which serves as pressure accumulator.

Figure 2:
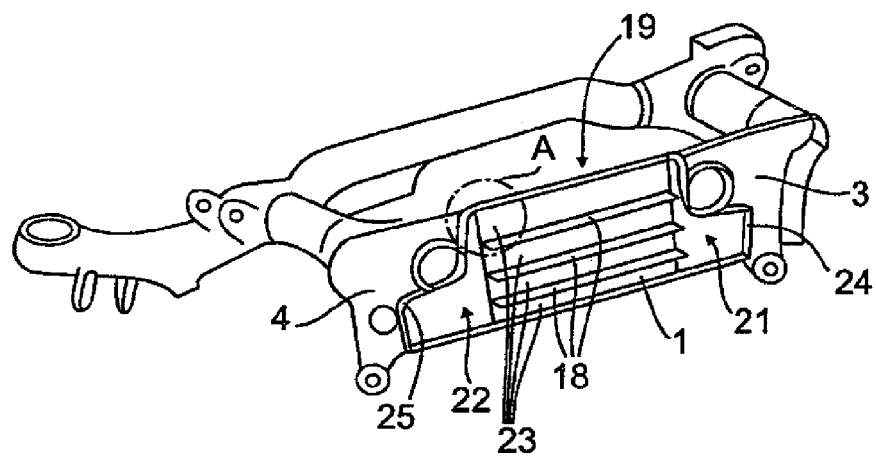
FIG. 2 a sectional view of the subframe of FIG. 1 taken along a longitudinal section B-B according to FIG. 1 in the region of the rear cross member, FIG. 3 an enlarged partial sectional view according to FIG. 2, FIG. 4 a view of the right cast node adjoining the rear cross member, and FIG. 5 a simplified illustration of the rear cross member of the auxiliary frame of FIG. 1 and FIG. 2, designed as extruded part.

In order to attain a high compressive strength of the cross member 1, the latter is configured as a rib-reinforced extruded part 15. The sectional view along the section plane B-B, as shown in FIG. 2, shows that the extruded part 15 has intermediate plates 18 which extend from the front side 19 (FIG. 1) to the rear side, not visible here, of the cross member 1. The intermediate plates 18 are more clearly shown in FIG. 5 at the open end face, and also the profile of the rear side 20 of the cross member 1 can be seen there.

Figure 3:
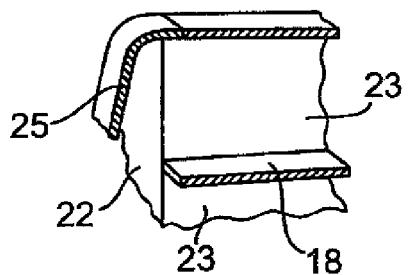

FIG. 3 shows an enlarged detail A according to FIG. 2. FIG. 2 and FIG. 3 show that the two cast nodes 3, 4 each have a connection cavity 21, 22 which spans the respectively associated end face of the cross member 1. The connection cavities 21, 22 thus form overflow spaces with respect to the intermediate spaces 23 formed by the intermediate plates 18. The wall 24, 25 respectively extending inside the cast nodes 3, 4, therefore forms a hood-shaped termination at the end faces of the cross member 1 (see also FIG. 4).

Figure 4:
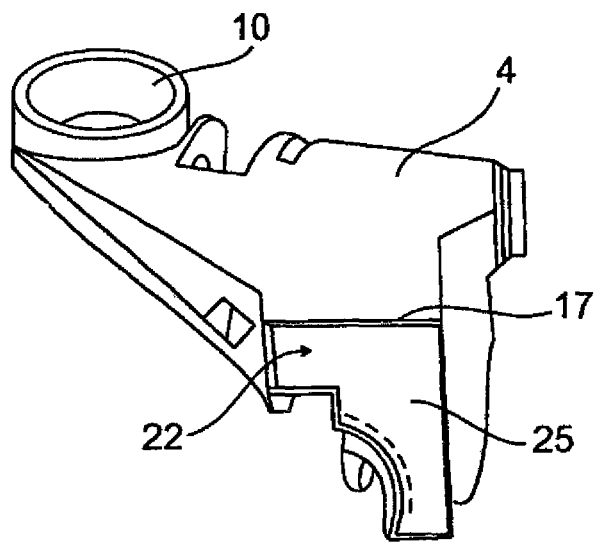

FIG. 4 shows the cast node 4 according to FIG. 1 and FIG. 2. In particular shown here is the edge region or edge 17 which points to the cross member 1 and is snugly welded to the cross member 1. The edge 17 extends out in the form of a web in relation to the wall 25 that is inwardly recessed into the cast node 4, so that the wall 25 together with the edge 17 forms the connection cavity 22 for the intermediate spaces 23 of the cross member 1.

Figure 5:
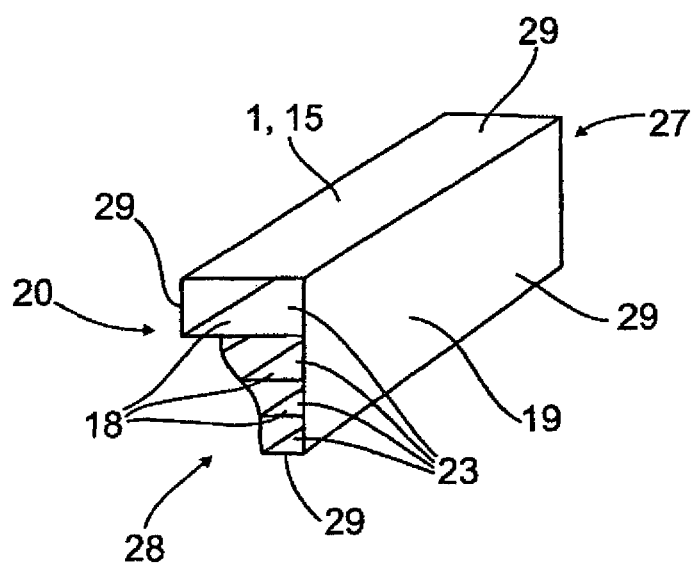

The edge 17 is welded with the end face 27, invisible in FIG. 5, of the cross member 1. The cast node 3 adjoins the visible end face 28 in a similar manner.

The profile of the cross member 1 or the extruded part 15, illustrated here by way of example, represents only one of many possibilities. Depending on the outer profile of the cross member 1, a different inner rib reinforcement can be provided between the outer walls 29 of the cross member 1. A cross member 1 profiled according to the invention can be used in combination with the cast nodes 3, 4, provided on both end faces 27, 28, as pressure accumulator which is able to withstand high pressure loads. Thus, a subframe designed in this way can be used in addition for different pneumatic or hydraulic storage functions.

What is claimed is:

1. A subframe for a chassis of a motor vehicle, comprising:
   rear and front cross members, each cross member having end faces, with the rear cross member configured in the form of a continuous rib-reinforced component;
   node elements respectively connected to the end faces of the cross members, with the rear cross member defining a pressure-resistant cavity for providing a pressure accumulator; and
   bearing elements mounted onto the node elements, for providing a subframe mount.

2. The subframe of claim 1, wherein the node elements are cast nodes welded to the cross members.

3. The subframe of claim 1, wherein the rib-reinforced component has at least one inner partition which extends between opposite outer walls of the rear cross member and divides the cavity of the rear cross member into a plurality of intermediate spaces.

4. The subframe of claim 3, wherein the partition has at least one of slots, bores or other openings, said node elements terminating flush at both end faces of the rib-reinforced component.

5. The subframe of claim 3, wherein the partition has a thickness which is at most half a thickness of the outer walls of the rib-reinforced component.

6. The subframe of claim 1, wherein the node elements associated with the rear cross member have each a connection cavity which spans a respectively associated open end of the rib-reinforced component.

7. The subframe of claim 6, wherein the rib-reinforced component has at least one inner partition which extends between opposite outer walls of the rear cross member and divides the cavity of the rear cross member into a plurality of intermediate spaces, said connection cavity being formed by at least one groove or overflow channel which extends between the intermediate spaces of the rib-reinforced component.

8. The subframe of claim 1, wherein the rear cross member has an approximately rectangular basic shape.

9. The subframe of claim 1, wherein at least one of the node elements has pneumatic or hydraulic connections for the pressure accumulator.

10. The subframe of claim 1, wherein the rear and front cross members form part of a rear axle subframe, and further comprising fastening eyes mounted onto the node elements for attachment of chassis control arms.

11. The subframe of claim 1, wherein the pressure accumulator forms an air reservoir for compressed air of an air suspension.

12. The subframe of claim 1, wherein the pressure accumulator is an oil reservoir for oil of an actively adjustable stabilizer or for transmission lubrication.

13. The subframe of claim 1, wherein the rib-reinforced component is an extruded part.

14. A subframe for a chassis of a motor vehicle, comprising:
   rear and front cross members, each cross member having end faces, with at least one of the rear and front cross members configured in the form of a continuous rib-reinforced component;
   node elements respectively connected to the end faces of the cross members, with the at least one of the cross members defining a pressure-resistant cavity for providing a pressure accumulator; and
   bearing elements, mounted onto the node elements, for providing a subframe mount.

15. The subframe of claim 14, wherein the node elements are cast nodes welded to the cross members.

16. The subframe of claim 14, wherein the rib-reinforced component has at least one inner partition which extends between opposite outer walls of the at least one of the cross members and divides the cavity of the at least one of the cross members into a plurality of intermediate spaces.

17. The subframe of claim 16, wherein the partition has at least one of slots, bores or other openings, said node elements terminating flush at both end faces of the rib-reinforced component.

18. The subframe of claim 16, wherein the partition has a thickness which is at most half a thickness of the outer walls of the rib-reinforced component.

19. The subframe of claim 14, wherein the node elements associated with the at least one of the cross members have each a connection cavity which spans a respectively associated open end of the rib-reinforced component.

20. The subframe of claim 19, wherein the rib-reinforced component has at least one inner partition which extends between opposite outer walls of the at least one of the cross members and divides the cavity of the at least one of the cross members into a plurality of intermediate spaces, said connection cavity being formed by at least one groove or overflow channel which extends between the intermediate spaces of the rib-reinforced component.

21. The subframe of claim 14, wherein the at least one of the cross members has an approximately rectangular basic shape.

22. The subframe of claim 14, wherein at least one of the node elements has pneumatic or hydraulic connections for the pressure accumulator.

23. The subframe of claim 14, wherein the rear and front cross members form part of a rear axle subframe, and further comprising fastening eyes mounted onto the node elements for attachment of chassis control arms.

24. The subframe of claim 14, wherein the pressure accumulator forms an air reservoir for compressed air of an air suspension.

25. The subframe of claim 14, wherein the pressure accumulator is an oil reservoir for oil of an actively adjustable stabilizer or for transmission lubrication.

26. The subframe of claim 14, wherein the rib-reinforced component is an extruded part.

* * * * *